(12) United States Patent
Itsuji et al.

(10) Patent No.: US 6,327,905 B1
(45) Date of Patent: Dec. 11, 2001

(54) AIR FLOW MEASUREMENT APPARATUS

(75) Inventors: Takayuki Itsuji; Hiroshi Hirayama, both of Hitachinaka (JP)

(73) Assignees: Hitachi, Ltd., Tokyo; Hitachi Car Engineering Co., Ltd., Hitachinaka, both of (JP)

(*) Notice: Subject to any disclaimer, the term of this patent is extended or adjusted under 35 U.S.C. 154(b) by 0 days.

(21) Appl. No.: 09/216,947

(22) Filed: Dec. 21, 1998

(30) Foreign Application Priority Data

Dec. 19, 1997 (JP) .................................................. 9-351298

(51) Int. Cl.$^7$ ....................................................... G01F 1/68
(52) U.S. Cl. ......................................................... 73/204.15
(58) Field of Search ............................ 73/204.11, 204.15, 73/204.18, 204.19, 204.14

(56) References Cited

U.S. PATENT DOCUMENTS

| | | | |
|---|---|---|---|
| 5,469,748 | 11/1995 | Kalotay . | |
| 5,493,906 | * 2/1996 | Sen-Zhi | 73/204.15 |
| 5,654,506 | * 8/1997 | Yoneda et al. | 73/204.11 |
| 6,023,969 | * 2/2000 | Feller | 73/204.25 |

FOREIGN PATENT DOCUMENTS 8-5425    1/1996   (JP) .

* cited by examiner

*Primary Examiner*—Harshad Patel
(74) *Attorney, Agent, or Firm*—Crowell & Moring LLP

(57) ABSTRACT

An improved heating resistor type air flow measurement apparatus which can operate properly even when the noises are produced by a large surge current, and even when the air flow measurement apparatus is made of plastic member. The apparatus has a heating resistor arranged in the main air passage, a temperature-sensitive resistor and a flow measurement circuit for processing signals from their resistors. Inductors are provided between these resistors to prevent noise invasion into the flow measurement circuit.

6 Claims, 5 Drawing Sheets

AIR FLOW MEASUREMENT APPARATUS

BACKGROUND OF THE INVENTION

The present invention relates to a heating resistor type air flow measurement apparatus for measuring air flow rate by using an amount of heat carried off by air from a resistor arranged in the airflow, and particularly to an air flow measurement apparatus suitable for the measurement of intake air flow in an internal combustion engine for automobiles.

Since a heating resistor type air flow measurement apparatus is superior in that it has no movable parts, and it is possible directly to detect a mass air flow rate, and further it is easy to miniaturize and save its weight. As a result, it is coming in for use in engine control for automobiles.

Recently, various kinds of plastic members have been developed. With the improvement, some components of the engine or the automobile are converted from the conventional metal-made components to the plastic-made. In recent years, the manufacturing cost and the product weight has been extremely reduced.

Under such a technical flow, the body of the air flow meter is also made of plastic member, instead of the metal-made.

As a result, newly one problem on electromagnetic interference has occurred. Namely, because in general a flow measurement circuit handles with a relatively feeble voltage, it is very susceptible to electromagnetic noises. There is, therefore, a strong fear that the malfunction may occur.

While, in an engine room of an automobile, the intensity of electromagnetic noises is relatively large. Therefore, the flow measurement circuit is susceptible to the electromagnetic noises.

In the case that the body of a main passage is metal-made, the electromagnetic shielding effect is large due to the conductivity of the body. The electromagnetic interference is thus reduced. While, in the case that the body is plastic-made, the problem of the electromagnetic interference is occurred, since the electromagnetic shielding effect is hardly expected.

For example, in the Japanese Patent Application Laid-Open No. 8-5425 (1996), such technique is disclosed, that characteristic of electromagnetic interference is provided by using a circuit having a low-pass filter between a heating resistor and a temperature-sensitive resistor, and a flow detection circuit.

In the prior art in which such a low-pass filter is provided, the effect of the capacitor of the filter is not taken into consideration. However, a noise current passing through the capacitor occurs when a large surge current caused by ignition noises flows. Thereby, the flow measurement circuit may fail to work properly.

Namely, the malfunction due to a normal radio frequency field is caused by noises induced mainly in the heating resistor and the temperature-sensitive resistor. With regard to such malfunction, it is possible to provide a necessary characteristic of the electromagnetic-interference-resistance to the air flow measurement apparatus by providing a low-pass filter as described above. On the contrary, when a large surge current is produced by the ignition noises, a large noise current passes through a capacitor of the low-pass filter, and the malfunction is thus induced.

SUMMARY OF THE INVENTION

An object of the present invention is to provide an improved heating resistor type air flow measurement apparatus which can operate properly even when the noises are produced by a large surge current, in other words, even when the body of the air flow measurement apparatus is made of plastic member.

According to one aspect of the present invention, the improved air flow measurement apparatus includes a resistor arranged in the airflow of which the amount is measured, and a control circuit for controlling the current passing through the resistor, and it detects the air flow rate based on the magnitude of the current. Further, the air flow measurement apparatus includes inductors provided on both sides of the resistor.

Preferably, in an air flow measurement apparatus according to the present invention, the control circuit includes an operational amplifier, and an inductor is provided between the operational amplifier and the resistor.

DESCRIPTION OF THE PREFERRED EMBODIMENTS

Before explaining the present invention, the configuration of the conventional air flow measurement apparatus will be described by referring to FIGS. 5 and 6.

Figure 5:
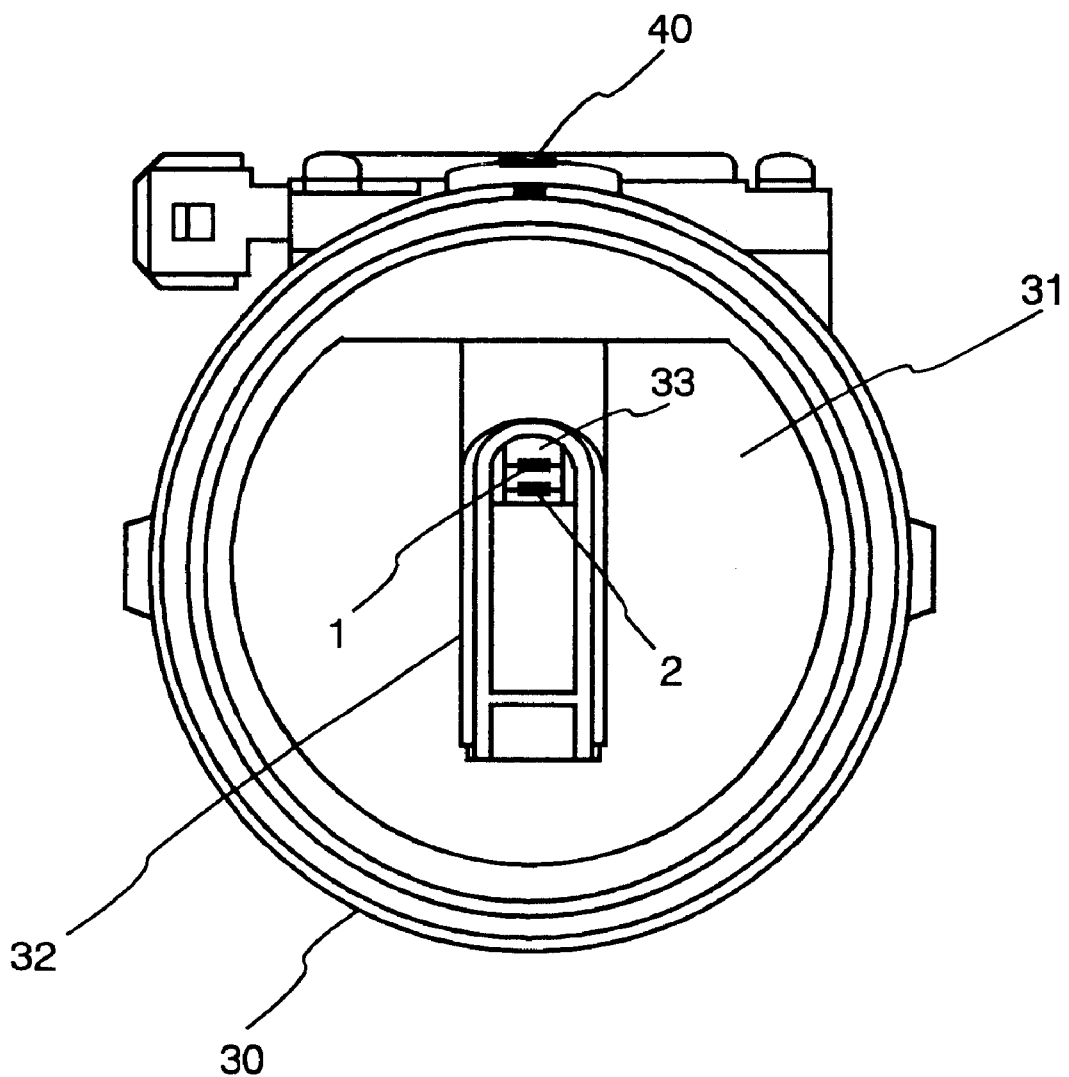
FIG. 5 is a front elevation of one example in construction of the conventional heating resistor type air flow measurement apparatus.
Figure 6:
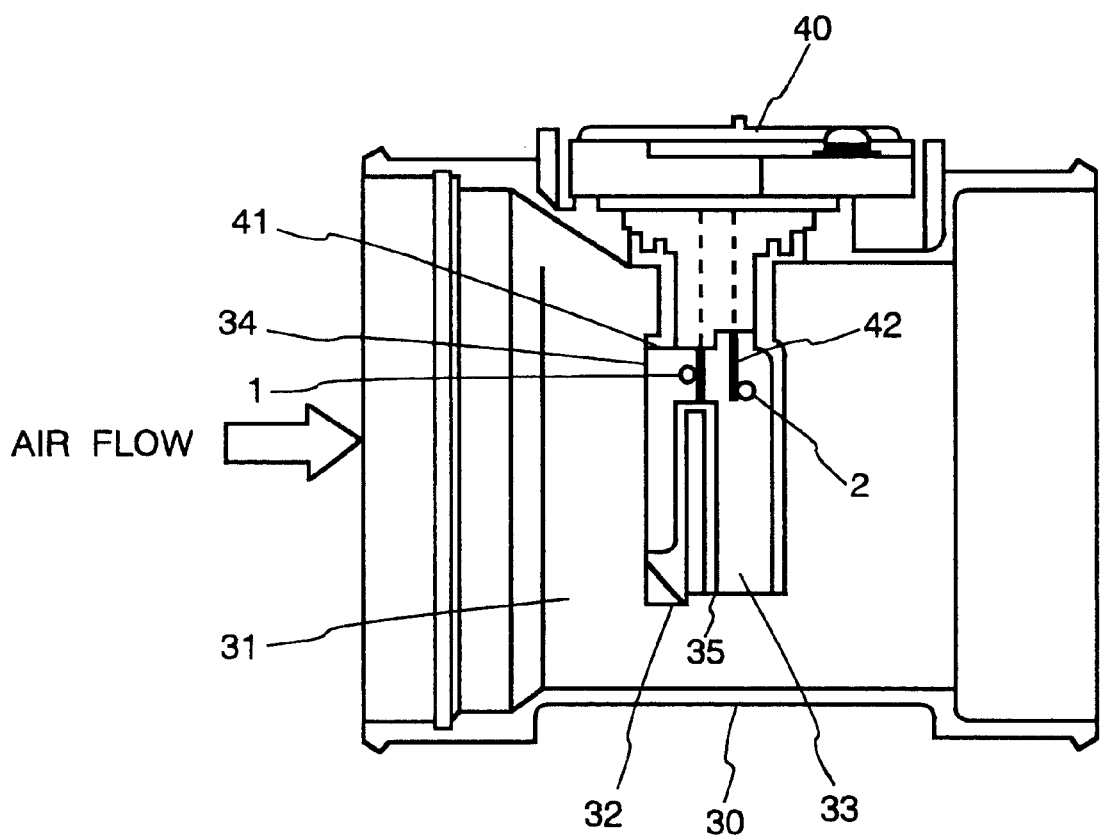
FIG. 6 is a sectional side elevation of one example in construction of the conventional heating resistor type air flow measurement apparatus.

FIGS. 5 and 6 show one example of the conventional heating resistor type air flow measurement apparatus, in which FIG. 5 is a front elevation and FIG. 6 is a sectional side elevation.

In these figures, reference numeral 1 designates a heating resistor, 2 a thermal-sensitive resistor, 30 a body of the air flow measurement apparatus, 31 a main passage, 32 a measuring unit, 33 a bypass passage or auxiliary air passage, 34 an inlet of the bypass passage, 35 an outlet of the bypass passage, 40 a sensor module, and 41, 42 bearing members.

The body 30 is made of approximately cylindrical member. It forms the main air passage 31 which is a portion of an air intake passage of an engine, and act as a body of the air flow measurement apparatus.

The measuring unit 32 forms the bypass passage 32 in which the heating resistor 1 and the thermal-sensitive resistor 2 are held by the bearing members 41, 42 each made of a conductive wire.

Where, the inlet 34 of the bypass passage 33 has its opening in the up-stream side of the main air passage 31. A part of the airflow entered from the direction of the arrow flows into the opening, and the intake airflow flows out of the outlet 35 of which the opening is provided in a side direction and joins a main airflow. Thereby the heating resistor 1 and the thermal-sensitive resistor 2 are protected from the effects of the variation of pressure provided from the down-stream side due to backfire of the engine.

A sensor module includes a circuit board on which the flow measurement circuit is mounted. The sensor module 40 is integrated with the measuring unit 32, and the heating resistor 1 and the thermal-sensitive resistor 2 are connected to the flow measurement circuit mounted on the circuit board, via the bearing members 41, 42. The measuring unit 32 is inserted into through the side surface and fixed to the body 30.

When the air flows to the main air passage 31, a part of the air flows into the bypass passage 33. Thereby, heat from the heating resistor 1 is deprived of by the airflow. As a result, the variation of temperature of the heating resistor 1 is detected as that of resistance value and thus a signal indicative of the air flow can be picked up through the flow measurement circuit mounted on the circuit board of the sensor module 40.

Referring now to FIGS. 1 to 4, embodiments of a heating resistor type air flow measurement apparatus according to the present invention will be explained hereinafter.

Figure 1:
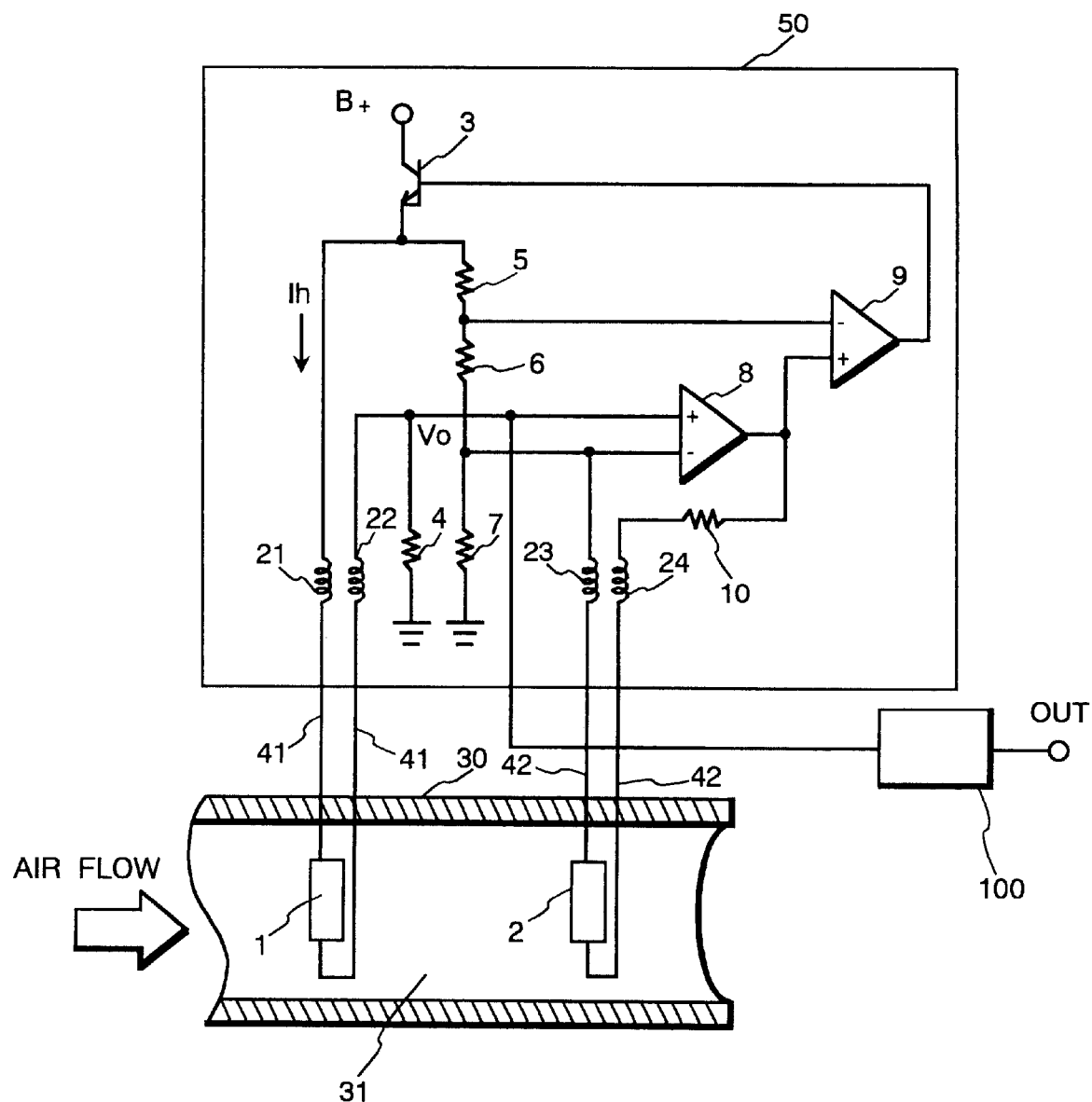
FIG. 1 is a circuit diagram of one embodiment of a heating resistor type air flow measurement apparatus according to the present invention.

FIG. 1 shows one embodiment of the present invention, in which reference numeral 50 designates a flow measurement circuit (temperature control circuit), and 100 an output circuit. In this embodiment, other reference numerals designate the same components as FIGS. 5 and 6 which have already described above.

The flow measurement circuit 50 and the output circuit 100 is mounted on a circuit board of a sensor module 40 shown in FIGS. 5 and 6.

As shown in FIG. 1, the flow measurement circuit 50 comprises a transistor 3 and a fixed resistors 4 to 7, 10, an operational amplifiers 8, 9, and inductors 21 to 24.

The flow measurement circuit 50 is connected to a heating resistor 1 and a temperature-sensitive resistor 2 provided inside of a bypass passage 33 (see FIGS. 5 and 6) via bearing members 41 and 42 each made of conductive wire.

Now, it should be noted that the heating resistor 1 and the temperature-sensitive resistor 2 may be provided inside of a main air passage 31, not inside of the bypass passage 33.

The heating resistor 1 and the temperature-sensitive resistor 2 forms a bridge circuit, along with a reference resistor 4, resistors 5, 6, 7, 10 and an operational amplifier 8. The equilibrium condition of the bridge circuit is detected by the operational amplifier. As a result, a current passing through the heating resistor 1 and the reference resistor 4 via the transistor 3 or a heating current Ih of the heating resistor 1 is controlled so that the difference of the temperatures of the heating resistor 1 and the temperature-sensitive resistor 2 may be maintained to be constant.

The value of the heating current Ih is expressed as a function of the speed and density of the fluid (ex. airflow) which carries off the heat from the heating resistor 1. It appears as a voltage Vo by passing through the reference resistor 4. Therefore, by picking up the voltage Vo of the reference resistor 4 using an output circuit 100, a signal indicative of the air flow rate is obtained at an output terminal out.

The output circuit 100 operates as a buffer amplifier for picking up the voltage Vo across the resister 4, and a converter for converting the voltage type signal of the air flow into the frequency type signal.

The inductor 21 to 24 are coils, and are connected between the bearing members 41, 42 and respective circuit elements of the flow measurement circuit 50 to be connected. As a result, even if radio frequency noises are induced into the heating resistor 1, the temperature-sensitive resistor 2 and the bearing members 41, 42, due to electromagnetic waves, electrostatic induction, electromagnetic induction or else, it becomes possible to prevent such radio frequency noises from entering into the flow measurement circuit 50.

Because the bearing members 41, 42 comprising the heating resistor 1, the temperature-sensitive resistor 2 and the conductive wire is apart in space from the flow measurement circuit 50 and extends into the main air passage 31 of the body 30 or the bypass passage, many radio frequency noises are induced unless the body 30 acts as the electromagnetic shielding member.

According to this embodiment, the noise voltages trying to enter inside through the bearing members 41, 42 can be extremely attenuated due to the impedance of the inductors 21 to 24, because there are inductors 21 to 24 between respective circuit elements of the flow measurement circuit 50 and the bearing members 41, 42. Therefore, the effect of the radio frequency noises can be suppressed.

According to the embodiment of FIG. 1, it is possible to operate properly the flow measurement circuit even when the body of the air flow measurement apparatus is made of plastic member.

Figure 2:
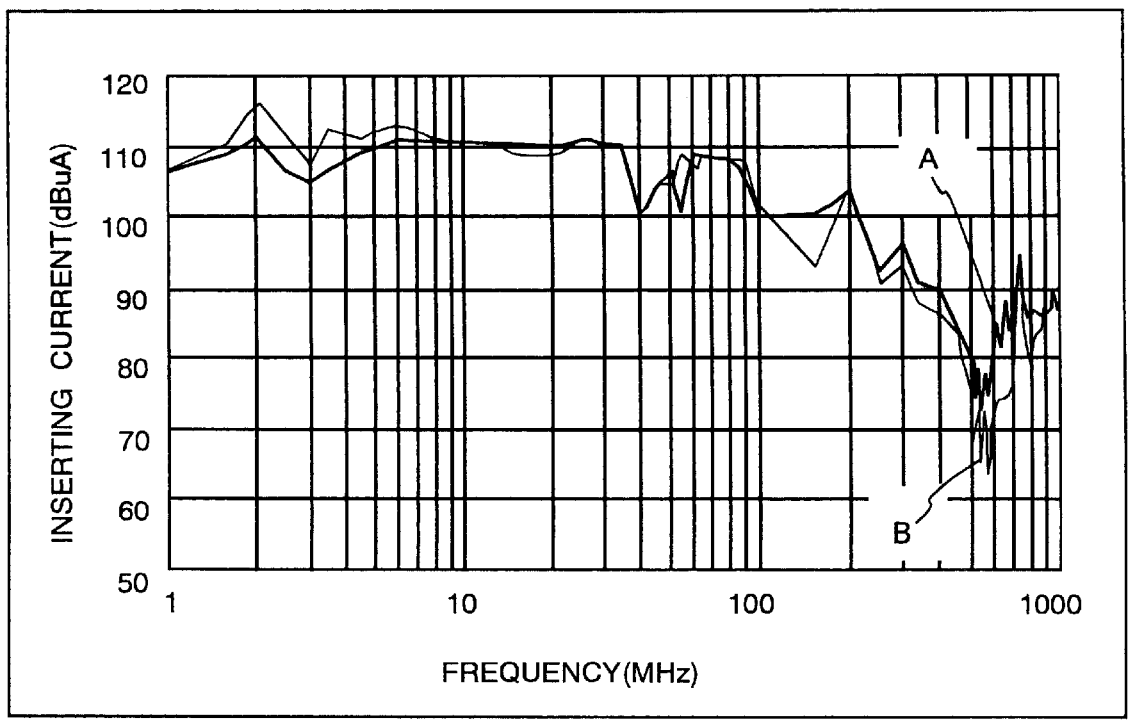
FIG. 2 is a graph showing the characteristics of the electromagnetic-interference-resistance obtained by using one embodiment of the present invention.

Now, FIG. 2 shows the results of comparative evaluation obtained by using the bulk current injection (BCI) method of the electromagnetic interference resistance characteristics, with respect to the heating resistor type air flow measurement apparatus of one embodiment of the present invention and the conventional air flow meter.

In FIG. 2, a thick line A designates the electromagnetic interference resistance characteristic of one embodiment of the present invention, and a thin line B the electromagnetic interference resistance characteristic of the prior art. As clearly seen from FIG. 2, the intensity of electric field can be improved to about 15 dB $\mu$A at maximum in one embodiment of the present invention.

While the electromagnetic interference resistance characteristic of the present invention is inferior to that of the prior art in the range between the frequency 2 MHz and 3 MHz, there is not practical problems because the intensity of electric field is more than 96 dB $\mu$A. Since compared with the prior art, the present invention has an excellent characteristic in the radio frequency band, we can say that the present invention is more useful than the prior art.

Figure 3:
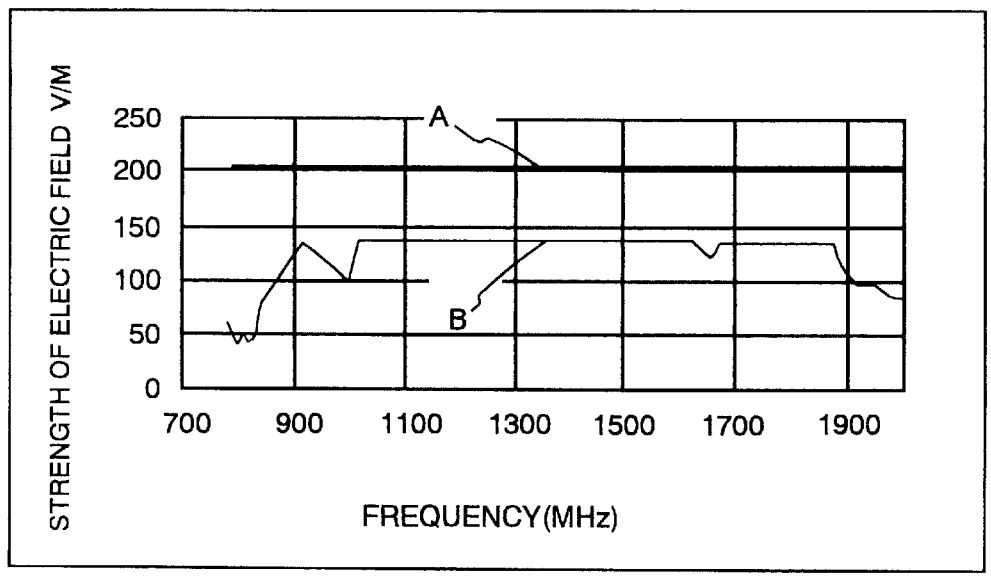
FIG. 3 is a graph showing the characteristics of the electromagnetic-interference-resistance obtained by using one embodiment of the present invention.

FIG. 3 shows the results of comparative evaluation concerning the intensity of electric fields measured when the engine goes to stop due to the malfunction of the air flow measurement apparatus, in which the heating resistor type air flow measurement apparatus of one embodiment of the present invention and the conventional air flow meter each was mounted on an automobile in a real-world setting, and an electric wave was radiated from an antenna fixed at the forward by 1 meter of the automobile.

Also in FIG. 3, a thick line A designates the electromagnetic interference resistance characteristic of one embodiment of the present invention, and a thin line B the electromagnetic interference resistance characteristic of the prior art. Further, the body of the air flow measurement apparatus is plastic-made. Furthermore, the capacity limit of the intensity of electric field by an electric wave radiating equipment is 200 V/M.

As clearly seen from the characteristic diagram shown in FIG. 3, the engine goes to stop at the minimum 40 V/M in the heating resistor type air flow measurement apparatus of the prior art. However, in the embodiment of the present invention, the engine does not stop even at 200 V/M. Namely, it will be appreciated that the present invention has a very excellent electromagnetic interference resistance characteristic.

According to the present invention, it is always possible to operate properly the air flow meter even when the body of the air flow measurement apparatus is made of plastic member having no the electromagnetic shielding effect. As a result, it becomes possible to reduce the manufacturing cost and the weight.

Next, another embodiment of the present invention will be explained with reference to FIG. 4.

In this embodiment, a bridge circuit is formed by the heating resistor 1 and the reference resistor 4, the temperature-sensitive resistor 2, and resistors 5, 6. The equilibrium condition of the bridge circuit is detected by the differential amplifier. As a result, a heating current Ih passing through the heating resistor 1 via the transistor 3 is controlled by an output of the differential amplifier 9. Other construction is the same as the embodiment of FIG. 1.

Also according to this embodiment, the voltage Vo is obtained by the reference resistor 4, and a signal indicative of the air flow rate is obtained from an output terminal out of the output circuit 100.

Because the inductors 21 to 23 are provided as described above, the air flow measurement apparatus can operate properly even when the body of the air flow measurement apparatus is made of plastic member. As a result, it becomes possible to reduce the manufacturing cost and the weight.

Figure 4:
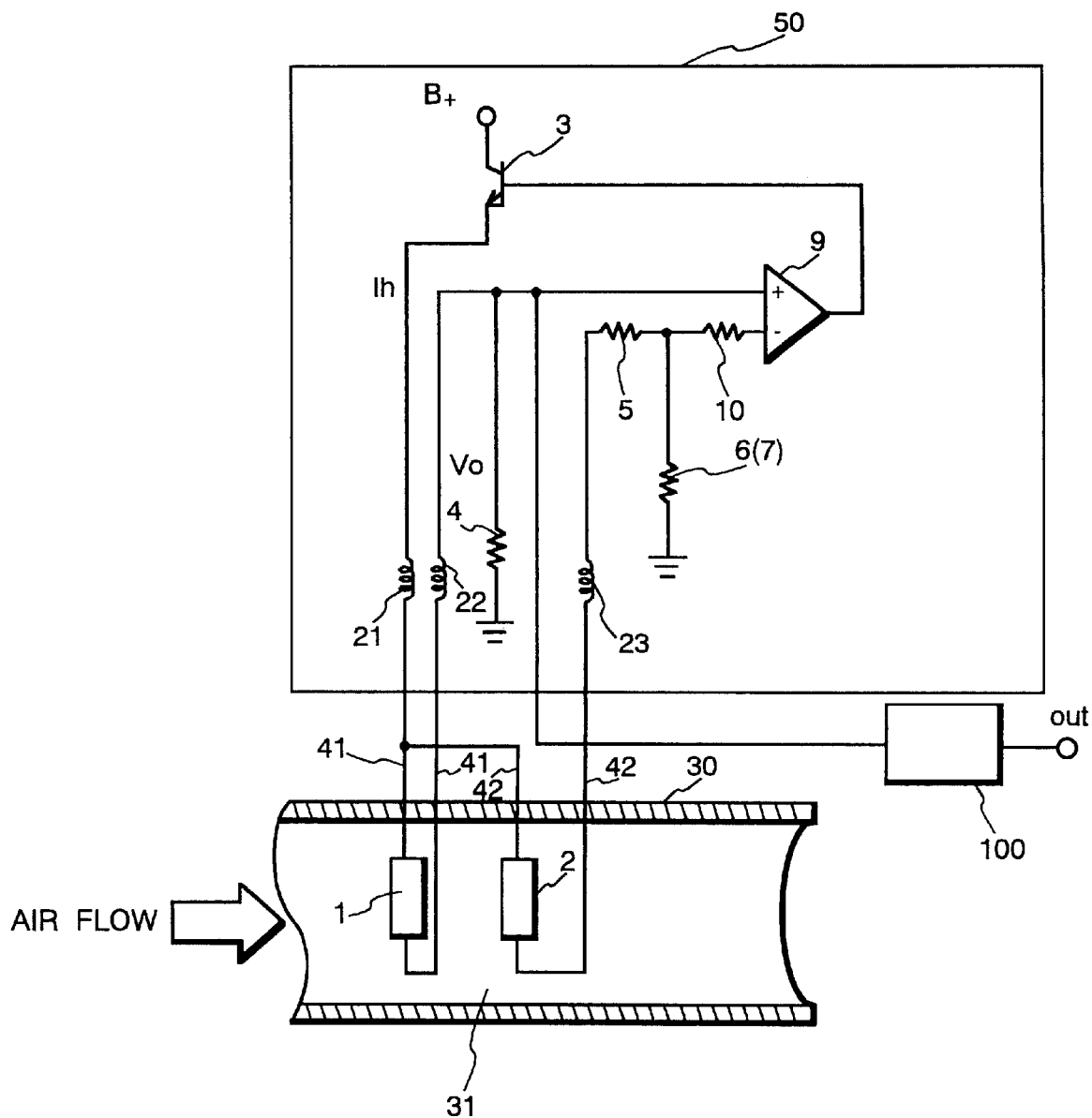
FIG. 4 is a circuit diagram of another embodiment of a heating resistor type air flow measurement apparatus according to the present invention.

The bridge circuit of FIG. 4 is different in construction from that of FIG. 1. In FIG. 4, one of the bearing members 41 and one of the bearing members 42 is connected together and extended into the flow measurement circuit 50, the inductor 24 among the four inductors shown in FIG. 1 can be eliminated in the embodiment of FIG. 4. Therefore, the cost of the product can be reduced by just that much.

In the embodiments described above, one terminal of the heating resistor 1 is connected only to an emitter of the transistor 3. Therefore, the effect of the noises is negligible even if the noises are applied to this portion. In other words, the deterioration of the electromagnetic-interference-resistance is very slight even if the inductance 21 connected to the bearing members 41 of the heating resistor 1 is eliminated.

It is possible to eliminate the inductor 21 according to the environment of service of the air flow measurement apparatus, and thus to reduce further the cost of the heating resistor type air flow measurement apparatus.

What is claimed is:

1. A heating-resistor type air flow measurement apparatus comprising a resistor operatively connected to a circuit on an electronic circuit board and arranged in an airflow to be measured, a control circuit for controlling current passing through the resistor, the air flow rate being measured based on a magnitude of the current, and inductors operatively connected in series on both sides of the resistor to attenuate noise in the resistance via inductive impedance.

2. The heating resistor type air flow measurement apparatus according to claim 1, wherein said resistor is at least one of a heating resistor and a thermal sensitive resistor.

3. The heating resistor type air flow measurement apparatus according to claim 2, wherein at least one inductor is operatively provided between said resistor and said control circuit.

4. The heating resistor type air flow measurement apparatus according to claim 1, wherein said control circuit includes an operational amplifier, and at least one inductor is provided between the operational amplifier and said resistors.

5. The heating resistor type air flow measurement apparatus according to claim 4, wherein said resistor is at least one of a heating resistor and a thermal sensitive resistor.

6. A method of measuring air flow rate, comprising:

using an amount of heat carried off by air from a resistance element operatively connected with an electrical current source and arranged in an air flow, with inductors operatively connected in series on both sides of the resistance element, controlling electrical current passing through the resistance element, and attenuating noise in the resistance element via inductive impedance.

* * * * *